United States Patent Office 3,390,952
Patented July 2, 1968

3,390,952
METHOD FOR EXTRACTING SELENIOUS OXIDE FROM GAS MIXTURES
Evnei Arstanovich Buketov and Mark Zalmanovich Ugorets, Karaganda, U.S.S.R., assignors to Khimiko-Metallurgichesky Institute An Kaz. SSR., Karaganda, U.S.S.R.
No Drawing. Filed Sept. 23, 1964, Ser. No. 398,752
11 Claims. (Cl. 23—2)

ABSTRACT OF THE DISCLOSURE

A process for the removal of selenious oxide from gas mixtures containing selenious oxide and sulfur dioxide comprising passing said gas mixture through zinc oxide, preferably at an elevated temperature to absorb selenious oxide on said zinc oxide.

---

The present invention relates to a method for extracting selenious oxide from gas mixtures.

A method is known wherein selenious oxide is extracted from gas mixtures by passing the gas mixture through a loose solid absorber, such as soda.

However, soda can be used successfully for extracting selenious oxide from gas mixtures only if the concentration of sulfur dioxide in these gas mixtures is low.

It is, therefore, the object of the present invention to provide a process by which selenious oxide can be extracted from gas mixtures having high concentrations of sulfur dioxide.

According to the present invention the problem has been solved by using granulated zinc oxide as the solid absorbing medium.

Any known type of equipment used for gas adsorption by means of a solid absorber can be used for extracting selenious oxide from gas mixtures by zinc oxide. Selenium can be extracted from zinc selenite by any of the known methods, for example, by calcining at a temperature from 600 to 700° C.

The method according to the present invention can be successfully used in the non-ferrous and rare metals industries for extracting selenious oxide from gas mixtures containing relatively small amounts of selenious oxide and relatively large amounts of sulfur dioxide.

The use of the proposed method can reduce the cost of extracting selenium from roaster gases which are used for sulfuric acid production. The method can also be successfully used for removing highly toxic selenious oxide from gas mixtures and also for extracting same from waste gases which are to be discharged into the open air.

For a better understanding of the invention by those skilled in the art the following example is given by way of illustration.

Example

Gaseous selenious oxide was passed through a 1 cm. bed of granulated zinc oxide. At a temperature of 300° C. the concentration of selenious oxide in the zinc oxide bed was as high as 30 percent.

Sulfur dioxide was also passed through an identical bed of zinc oxide under the same conditions. The experiment showed that zinc oxide absorbs absolutely no sulfur dioxide at the given temperature.

We claim:
1. A method for extracting selenious oxide from a gas mixture comprising passing a gas mixture containing selenious oxide through granulated zinc oxide.
2. A method according to claim 1, wherein said passing of the gas mixture is effected at an elevated temperature.
3. A method according to claim 2, wherein the temperature is about 300° C.
4. A method as claimed in claim 1, wherein the gas mixture contains sulfur dioxide.
5. A method as claimed in claim 4, wherein the gas mixture contains a greater amount of sulfur dioxide than of selenious oxide.
6. A method comprising extracting selenious oxide from roaster gases used in the production of sulfuric acid by passing said roaster gases through granulated zinc oxide.
7. A method as claimed in claim 6, wherein the roaster gas is passed through granulated zinc oxide at an elevated temperature.
8. A method as claimed in claim 7, wherein the temperature is about 300° C.
9. A method as claimed in claim 6, wherein the roaster gas contains sulfur dioxide.
10. A method as claimed in claim 9, wherein the roaster gas contains a greater amount of sulfur dioxide than of selenious oxide.
11. A method for rendering a waste gas free of selenious oxide which comprises passing a waste gas through granulated zinc oxide prior to discharging said waste gas into the atmosphere.

No references cited.

OSCAR R. VERTIZ, *Primary Examiner.*

EARL C. THOMAS, *Examiner.*